US011081251B2

(12) United States Patent
Gossard et al.

(10) Patent No.: US 11,081,251 B2
(45) Date of Patent: Aug. 3, 2021

(54) SUCTIONABLE GEL AND METHOD FOR ELIMINATING A CONTAMINATION CONTAINED IN A SURFACE ORGANIC LAYER OF A SOLID SUBSTRATE

(71) Applicant: COMMISSARIAT À L'ÉNERGIE ATOMIQUE ET AUX ÉNERGIES ALTERNATIVES, Paris (FR)

(72) Inventors: Alban Gossard, Avignon (FR); Fabien Frances, Rousson (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 85 days.

(21) Appl. No.: 16/323,095

(22) PCT Filed: Aug. 2, 2017

(86) PCT No.: PCT/FR2017/052171
§ 371 (c)(1),
(2) Date: Feb. 4, 2019

(87) PCT Pub. No.: WO2018/024990
PCT Pub. Date: Feb. 8, 2018

(65) Prior Publication Data
US 2019/0189301 A1      Jun. 20, 2019

(30) Foreign Application Priority Data

Aug. 5, 2016 (FR) .................................. 16 57620
Apr. 7, 2017 (FR) .................................. 17 53083

(51) Int. Cl.
*B01J 20/12* (2006.01)
*B01J 20/18* (2006.01)
(Continued)

(52) U.S. Cl.
CPC .............. *G21F 9/001* (2013.01); *B01J 20/08* (2013.01); *B01J 20/12* (2013.01); *B01J 20/18* (2013.01);
(Continued)

(58) Field of Classification Search
CPC ...... B01J 20/12; B01J 20/18; B01J 20/28047; B01J 20/08; B01J 20/06; B01J 20/16;
(Continued)

(56) References Cited

U.S. PATENT DOCUMENTS 4,561,991 A * 12/1985 Herbots ............... C11D 3/3723
510/281
5,271,773 A    12/1993 Amilton et al.
(Continued)

FOREIGN PATENT DOCUMENTS

FR    2827530 A1    1/2003
FR    2891470 A1    4/2007
(Continued)

OTHER PUBLICATIONS

International Search Report for PCT/FR2017/052171 dated Dec. 6, 2017.
(Continued)

*Primary Examiner* — Katherine Zalasky McDonald
(74) *Attorney, Agent, or Firm* — Pearne & Gordon LLP

(57) ABSTRACT

A suctionable gel for eliminating a contaminating species contained in an organic layer on the surface of a material, consisting of a colloidal solution comprising, preferably consisting of: 1 wt % to 25 wt %, preferably 5 wt % to 20 wt % based on the total weight of the gel, of at least one inorganic viscosifying agent; 13 wt % to 99 wt %, preferably 80 wt % to 95 wt % based on the total weight of the gel, of an organic solvent selected among the terpenes and the mixtures thereof; optionally, 0.01 wt % to 10 wt %, based on
(Continued)

the total weight of the gel, of at least one dye and/or pigment; optionally 0.1 wt % to 2 wt %, based on the total weight of the gel, of at least one surfactant. The disclosure further relates to a decontamination method using the gel.

20 Claims, 5 Drawing Sheets

(51) Int. Cl.
| | | |
|---|---|---|
| B01J 20/28 | (2006.01) | |
| B01J 20/08 | (2006.01) | |
| G21F 9/00 | (2006.01) | |
| C09D 9/00 | (2006.01) | |
| G21F 9/30 | (2006.01) | |
| C09D 7/43 | (2018.01) | |
| C11D 7/02 | (2006.01) | |
| C11D 7/24 | (2006.01) | |
| C09D 7/20 | (2018.01) | |
| C11D 17/00 | (2006.01) | |
| C11D 7/50 | (2006.01) | |
| C11D 7/20 | (2006.01) | |
| C11D 3/40 | (2006.01) | |
| B08B 7/04 | (2006.01) | |
| C08K 5/00 | (2006.01) | |

(52) U.S. Cl.
CPC ......... *B01J 20/28047* (2013.01); *B08B 7/04* (2013.01); *C09D 7/20* (2018.01); *C09D 7/43* (2018.01); *C09D 9/00* (2013.01); *C09D 9/005* (2013.01); *C11D 3/40* (2013.01); *C11D 7/02* (2013.01); *C11D 7/20* (2013.01); *C11D 7/24* (2013.01); *C11D 7/248* (2013.01); *C11D 7/5027* (2013.01); *C11D 17/00* (2013.01); *C11D 17/003* (2013.01); *G21F 9/002* (2013.01); *G21F 9/30* (2013.01); *C08K 5/0008* (2013.01); *Y02P 20/582* (2015.11)

(58) Field of Classification Search
CPC .... C11D 7/02; C11D 7/20; C11D 7/24; C11D 7/248; C11D 7/5004; C11D 7/5022; C11D 17/003
See application file for complete search history.

(56) References Cited

U.S. PATENT DOCUMENTS

| | | | | |
|---|---|---|---|---|
| 5,279,758 A | * | 1/1994 | Choy .................. | C11D 1/29 510/370 |
| 5,670,469 A | * | 9/1997 | Dingus ................ | C11D 3/18 106/31.94 |
| 5,690,539 A | | 11/1997 | Swidler et al. | |
| 6,153,571 A | * | 11/2000 | Komocki ............. | C11D 3/2034 510/190 |
| 6,294,511 B1 | * | 9/2001 | Argo .................... | C11D 17/003 510/238 |
| 6,455,751 B1 | * | 9/2002 | Hoffman .............. | A62D 3/38 252/186.1 |
| 7,713,357 B2 | | 5/2010 | Faure et al. | |
| 8,636,848 B2 | | 1/2014 | Faure et al. | |
| 9,451,765 B2 | | 9/2016 | Cuer et al. | |
| 2003/0223942 A1 | * | 12/2003 | Lister .................. | C01G 49/06 424/63 |
| 2004/0175505 A1 | * | 9/2004 | Faure .................. | C11D 3/124 427/377 |
| 2005/0061357 A1 | * | 3/2005 | Steward .............. | G21F 9/28 134/6 |
| 2008/0228022 A1 | * | 9/2008 | Faure .................. | C11D 3/1213 588/18 |
| 2009/0197790 A1 | * | 8/2009 | Sengupta ............ | C11D 3/1266 510/372 |
| 2013/0023713 A1 | * | 1/2013 | Labe ................... | G21F 9/04 588/2 |
| 2013/0171024 A1 | * | 7/2013 | Cuer ................... | A01N 25/04 422/28 |
| 2016/0050911 A1 | | 2/2016 | Ludwig et al. | |
| 2016/0057993 A1 | | 3/2016 | Ludwig et al. | |
| 2017/0239694 A1 | | 8/2017 | Ludwig et al. | |

FOREIGN PATENT DOCUMENTS

| | | |
|---|---|---|
| FR | 2957929 A1 | 9/2011 |
| FR | 2962046 A1 | 1/2012 |
| FR | 3003763 A1 | 10/2014 |
| FR | 3027310 A1 | 4/2016 |
| WO | 97/08254 A1 | 3/1997 |
| WO | 97/35323 A1 | 9/1997 |
| WO | 99/09134 A1 | 2/1999 |
| WO | 2012/001046 A1 | 1/2012 |
| WO | 2013/023021 A1 | 2/2013 |
| WO | 2014/154817 A1 | 10/2014 |
| WO | 2014/154818 A1 | 10/2014 |

OTHER PUBLICATIONS

Written Opinion for PCT/FR2017/052171 dated Dec. 6, 2017.
Preliminary Search Report for French Application No. 16 57620 dated Apr. 18, 2017.
Preliminary Search Report for French Application No. 17 53083 dated Jul. 31, 2017.
U.S. Appl. No. 16/316,686, entitled "Adsorbent and Photocatalytic Decontamination Gel, and Method for Decontaminating Surfaces Using Said Gel", filed Jan. 10, 2019.
International Preliminary Report on Patentability for PCT/FR2017/052171, dated Oct. 30, 2018.

* cited by examiner

SUCTIONABLE GEL AND METHOD FOR ELIMINATING A CONTAMINATION CONTAINED IN A SURFACE ORGANIC LAYER OF A SOLID SUBSTRATE

CROSS-REFERENCE TO RELATED APPLICATIONS

This is a National Stage application of PCT international application PCT/FR2017/052171, filed on Aug. 2, 2017, which claims the priority of French Patent Application Nos. 16 57620 and 17 53083, filed Aug. 5, 2016 and Apr. 7, 2017, respectively, both of which are incorporated herein by reference in their entirety.

TECHNICAL FIELD

The object of the present invention relates to a gel for eliminating a contamination, for example a radioactive contamination, contained in a surface organic layer of a solid substrate.

More specifically, the term 'organic layer' is understood to refer to a layer made of an organic material, consisting (constituted) of an organic material.

In the present document, the terms contamination, for example radioactive contamination, contaminant, for example radioactive contaminant, or contaminant, contaminating species, for example radioactive contaminant, contaminating species are used interchangeably.

The contaminant species that can be eliminated by the gel according to the invention may be in particular radioactive and/or chemically toxic contaminant species, and/or toxic on account of their shape/form and/or of their size such as dusts, microparticles, nanoparticles, or fibres.

In particular, the gel according to the invention may be used in order to remove asbestos, contained in a surface organic layer of a solid substrate.

The present invention in addition relates to a method for eliminating a contamination, for example a radioactive contamination, contained in a surface organic layer of a solid substrate.

This organic layer may be a contaminated surface organic layer of a solid substrate consisting of an organic material.

More specifically, in this case, the contaminated surface organic layer is an integral part of the solid substrate and the organic layer and the solid substrate are constituted of the same organic material.

This solid substrate consisting of an organic material may be a bulk, solid, substrate or a layer, such as a layer of paint or epoxy resin, for example a layer of paint or epoxy resin forming a coating on a surface of a (another) solid substrate.

Or else, this organic layer may be a layer consisting of a contaminated organic material, that is found on a surface of a solid substrate, this layer being present in particular in the form of a spot/patch or discrete spots/patches of contaminated organic material viling said surface, for example a contaminated bitumen or oil spot/patch which soils said surface.

In this case, the contaminated surface layer and the solid substrate are not constituted of the same organic material and the solid substrate may be constituted of any material: metal, resin, paint, etc.

The technical field of the invention may be defined, in general, as the field of decontamination, for example of radioactive decontamination of surfaces, with a view to eliminating the contamination from these surfaces, for example the radioactive decontamination, that is to say, of the contaminant species, for example, the radioactive contaminant species.

The invention is applicable, in particular, to the decontamination of contaminated surfaces in the context of the decommissioning and clean-up of nuclear facilities and installations, or in the context of the asbestos removal from buildings.

STATE OF THE PRIOR ART

In the context of decommissioning and clean-up of nuclear facilities and installations, various steps of decontamination are necessary.

The diversity of materials present in the nuclear facilities as well as the surface condition of these materials make the decontamination operations difficult and entail the need to adapt the treatment methods and processes to the materials and to the targeted contamination.

In particular, one of the most important problems that arises is the decontamination of contaminated organic matrices composed of contaminated organic materials, such as epoxy paints or resins, or the decontamination of surfaces soiled with traces of contaminated organic matrices, such as contaminated bitumen or oil spots/patches that are often present on the sites of nuclear facilities.

Difficulties are encountered mainly when the contamination is embedded, encrusted within the organic matrix.

The decontamination methods and processes used today for the decontamination of organic matrices such as wall paints or epoxy resins in particular call for the use of conventional surface cleaning techniques making use of wipes—dry-used or impregnated with decontaminant solutions and/or degreasing solutions—or wiping techniques, which are carried out manually in nuclear environments often very sensitive.

A number of rather rudimentary mechanical decontamination methods, processes are also used. These are decontamination methods, processes that use techniques such as cutting, sanding or pickling. These techniques are tedious and cumbersome in terms of implementation, generate dusts, and are often not very effective on relatively thick organic layers.

These mechanical decontamination methods, processes are currently being subjected to optimisation and are at present often coupled with thermal processes using, for example, lasers or thermic lances.

Despite this these optimised mechanical processes continue to be relatively restrictive from the point of view of the cumbersomeness and demanding nature of the work. In addition, the application of a thermal process could significantly increase the cost of implementation.

Other decontamination methods, processes use aqueous or organic chemical solvents. These methods can also enable the decontamination of contaminated organic matrices by applying the solvents directly onto the surfaces of these matrices.

However, these decontamination methods, processes that use chemical solvents are relatively little used on decontamination sites, due to the fact that they produce significant amounts of contaminated effluents.

With regard to the elimination of traces of contaminated organic matrices, such as contaminated oil or bitumen spots, patches that soil the surfaces of nuclear installations, indeed there still does not exist any appropriate decontamination methods, processes, more so given that these traces of organic matrices are generally sticky and fixed to the support on which they are formed. This is particularly the case for contaminated bitumen spots/patches.

There certainly exist suction systems that provide the ability to recover the labile dusts on a substrate, but these systems are not suitable for sticky deposits. In addition, following the operational use of these aspiration systems, a scrubber-dryer is generally used, but it produces a significant amount of effluents.

Finally, for strongly adherent spots/patches, human intervention is necessary with cumbersome and tedious washing operations involving the use of wipes or scraping.

Among the documents of the prior art which describe the use of an organic solvent, mention may be made of the document FR-A1-2 957 929 [5].

This document relates to a treatment method for treating a solid surface, in particular an antifouling treatment method that is suitable for the curative treatment and/or preventive treatment of a solid surface. This method is intended in particular for the elimination and/or prevention of graffiti and tags.

According to this method, a composition comprising at least one ester of a carboxylic acid which is an ester, referred to as an odd acid ester, is applied to the surface. This composition may be in the form of a microemulsion.

There is neither any mention nor any suggestion that this composition may be in the form of a gel.

Among the documents of the prior art which describe the use of an organic solvent, in the form of a gel, mention may be made of the document WO-A1-99/09134 [3].

This document relates to a cleaning composition for eliminating long-chain compounds such as bitumen, tar, wax and chewing gum which comprises of an inert gel matrix within which is entrapped a non-aqueous liquid solvent, wherein the long-chain compound is soluble.

The matrix of the gel is formed for example by a silica or a clay, but not by an alumina.

The solvent may be selected from among saturated and unsaturated hydrocarbons, alcohols, glycols, aldehydes, ketones, ethers, terpenes, phthalates, esters, or halogenated hydrocarbons.

The gel noted in this document is not a gel that can be qualified as a suctionable gel.

In addition, in this document, there is no description of the method that is used to apply or operationally implement the gel.

The only example given in this document relates to the elimination of chewing gum whose composition is very far from that of the contaminated surface layers which are generally constituted of an epoxy resin or of a paint, and from that of the spots/patches of contaminated organic material, which are generally constituted of contaminated oil or bitumen.

In addition, the long-chain compounds, for example chewing gum, that are eliminated in the disclosure of this document are not contaminated by contaminant species, for example by radioactive contaminant species, and therefore do not contain such species.

Finally, there is neither any mention nor any suggestion in this document that the gel described therein can be used in order to solve the specific problem of eliminating a contamination, such as a radioactive contamination, contained in a layer of an organic material.

In addition, in the context of nuclear decontamination, gelled formulations that make it possible to overcome the problems related to the pulverulent nature of the dry waste, and to increase the effectiveness of the method involving operationally implementing a gel, were the subject matter of the documents FR-A1-2 827 530 [1] and FR-A1-2 891 470 [2].

These documents describe inorganic colloidal gels referred to as "suctionable gels" ("vaccumable gels"), specifically formulated so as to be sprayed, then to dry by fracturing, while trapping and confining the radioactive contamination in the form of non-pulverulent flakes, that are suctionable, and may be directly packaged and stored.

The document [1] describes a gel consisting of a colloidal solution comprising an inorganic viscosifying agent, generally silica or alumina, an active treatment agent which is, for example, an inorganic acid or base such as sodium hydroxide or potash, and optionally an oxidising agent having a normal oxidation-reduction or redox potential $E_0$ that is greater than 1.4 V in a strong acid medium such as Ce(IV), Co(III), or Ag(II).

The document [2] describes a gel consisting of a colloidal solution comprising an inorganic viscosifying agent, generally silica or alumina, a surfactant, an inorganic acid or base, optionally an oxidising agent having a normal oxidation-reduction or redox potential $E_0$ that is greater than 1.4 V in a strong acid medium such as Ce(IV), Co(III), or Ag(II).

These inorganic colloidal gels, on account of the various different constituents used in their composition have a rheology that makes possible the spraying thereof on a contaminated surface, and followed by the adhesion thereof to this surface, even if vertical, without running off.

This thus allows for prolonged contact to occur between the contaminant and the active decontamination agent, without the mechanical properties of the substrate being altered.

Following its spraying, the gel dries, fractures, and produces dry residues, referred to as "flakes", that adhere to the substrate and which are subsequently removed by brushing or suction in order to be directly packaged.

The decontamination methods and processes that use these suctionable gels are therefore decontamination methods using dry processes that generate no liquid effluents and few dry solid residues. Indeed, these dry solid residues represent on average only a quarter of the weight of the initially sprayed gel. In addition, these methods limit the time of exposure of the operators to radioactive contamination, by virtue of their ease of implementation by way of spraying followed by suction of the dry residues, and due to the fact that the presence of the operator is not required during the drying of the gel.

The gels described in the documents [1] and [2], however, are specifically intended for the elimination of a radioactive contamination, which is found on the surface of a substrate, whether it be an organic or other type of substrate. This radioactive contamination is not contained in a layer of an organic material.

The gels mentioned in these documents are not, in any way, specifically adapted to the elimination of a contamination, for example of a radioactive contamination, contained in a layer of an organic material, or even capable to be adapted to the elimination of a contamination, for example of a radioactive contamination, contained in a layer of an organic material.

There is neither any mention nor any suggestion in the documents [1] and [2] that the gels mentioned in these documents provide the means to resolve the extremely specific problem of elimination of a contamination, for example of a radioactive contamination, contained in a layer of an organic material, integrated within an organic matrix, which is a totally different problem from the problem of elimination of a contamination, for example of a radioactive contamination, on the surface.

The inventors have shown that the suctionable gels described in the documents [1] and [2], although they have been used for some years in the field of surface nuclear decontamination, on surfaces made of materials like steels, such as stainless steel, aluminium or lead, were not at all effective with respect to eliminating a contamination, for example a radioactive contamination, contained in a layer of an organic material, incorporated within an organic matrix, in other words, when it involves decontaminating organic matrices of such types as wall paint/paintings or bitumen spots/patches.

The documents FR-A1-2962046 and WO-A1-2012/001046 [6] relate to a "suctionable", "vaccumable" biological decontamination gel and to a decontamination method for the biological decontamination of surfaces using this gel.

This gel consists of a colloidal solution comprising at least one inorganic viscosifying agent, at least one biological decontamination agent, at least one superabsorbent polymer, at least one surfactant, with the remainder being a solvent.

The documents FR-A1-3003763 and WO-A1-2014/154818 [7] relate to an oxidising alkaline, "suctionable" biological decontamination gel and to a method for the biological decontamination of surfaces using this gel.

This gel consists of a colloidal solution comprising of at least one inorganic viscosifying agent, an active biological decontamination agent consists of the combination of a specific mineral base, such as sodium hydroxide, and of a specific oxidising agent stable in a basic medium, such as sodium hypochlorite, optionally a surfactant, with the remainder being a solvent. In addition, this gel does not contain any superabsorbent polymer.

The gels mentioned in the documents [6] and [7] are, however, specifically intended for the biological decontamination of surfaces, in particular for what is referred to as post-event decontamination of surfaces. This biological contamination is found on the surface of a substrate, whether it be an organic or other type of substrate. This biological contamination is not contained in a layer made of an organic material.

The gels mentioned in these documents are not, in any way, specifically adapted to the elimination of a contamination, such as a radioactive contamination, contained in a layer of an organic material, or even capable of being adapted to the elimination of a contamination, such as radioactive contamination, contained in a layer of an organic material.

There is neither any mention nor any suggestion in the documents [6] and [7] that the gels mentioned in these documents provide the means to resolve the extremely specific problem of elimination of a contamination, for example a radioactive contamination, contained in a layer of an organic material, integrated within an organic matrix, which is a totally different problem from the problem of elimination of a biological contamination, on the surface.

The document FR-A1-3 027 310 [4] relates to a suctionable gel for eliminating graffiti and to a method for eliminating graffiti.

This gel consists of a colloidal solution comprising an organic viscosifying agent, one or more organic solvents selected in particular from alkyl acetates, optionally a surfactant, and optionally at least one dye and/or pigment.

The gel described in the document [4], however, is specifically intended for the elimination of a graffiti containing no contamination, for example no radioactive contamination.

The gel mentioned in this document is not, in any way, adapted to the elimination of a contamination, such as a radioactive contamination, contained in a layer of an organic material, or even likely to be adapted to the elimination of a contamination, such as a radioactive contamination, contained in a layer of an organic material.

There is neither any mention nor any suggestion in the document [4] that the gels mentioned in these documents provide the means to resolve the extremely specific problem of elimination of a contamination, such as a radioactive contamination, contained in a layer made of an organic material, integrated within an organic matrix, which is a totally different problem from the problem of elimination of graffiti.

In the light of the above, there is therefore a need for an suctionable gel and a method for eliminating a contamination, for example a radioactive contamination, contained in a surface layer made of an organic material, integrated within an organic matrix.

In other words, there is a need for suctionable gel formulations that are able to decontaminate surfaces composed of organic materials, for example surfaces composed of paint or epoxy resin, or surfaces soiled with contaminated organic materials, such as bitumen or oil spots/patches that can be found in particular, but not only, in nuclear facilities.

The goal of the present invention is to provide a suctionable gel that meets these needs, among others.

The goal of the present invention is still to provide a suctionable gel which does not have the drawbacks, defects and disadvantages of the gels of the prior art and which solves the problems of the gels of the prior art, such as the gels mentioned in the documents [1 and 2].

DESCRIPTION OF THE INVENTION

This goal, and still others, are achieved, according to the invention, by a suctionable gel for eliminating a contaminant species, for example a radioactive contaminant species, contained in a layer consisting of an organic material, on the surface ("en surface") of a solid substrate, consisting of a colloidal solution comprising, preferably consisting of:

1% to 25% by weight, preferably 5% to 20% by weight, for example 10% by weight, in relation to the total weight of the gel, of at least one inorganic viscosifying agent;

13% to 99% by weight, preferably 80% to 95% by weight, for example 90% by weight, based on the total weight of the gel, of one or more organic solvent(s) selected from among the terpenes;

optionally from 1% to 40% by weight, preferably from 10% to 20% by weight, based on the total weight of the gel, of ethanol;

optionally from 0.01% to 10% by weight, based on the total weight of the gel, of at least one dye and/or pigment;

optionally from 0.1% to 2% by weight, based on the total weight of the gel, of at least one surfactant (surface active agent);

optionally, from 0.1% to 10% by weight, preferably from 1% to 5% by weight, based on the total weight of the gel, of at least one extracting agent (extractant) for extracting the contaminant species, for example of at least one extracting agent for extracting radionuclides, preferably selected from zeolites and clays.

The sum of the percentages by weight of all of the components, constitutents of the gel is obviously 100% by weight.

The gel according to the invention has never been disclosed in the prior art.

The meaning of the term "gel" is perfectly clear to the man skilled in the art and has a widely accepted significance.

However, generally, it can be considered that a gel may have a viscosity that is greater than or equal to 0.1 Pa·s.

The gel according to the invention is first of all fundamentally defined in that it is a gel referred to as a "suctionable gel".

The term "suctionable gel" ("vaccumable gel"), as has already been mentioned here above is a term commonly used in this technical field, it thus has a widely accepted meaning.

A suctionable gel is intrinsically different from a gel that is not suctionable.

The gel according to the invention is then characterised in that it contains one or more specific organic solvent(s) selected from among terpenes and mixtures thereof.

This/these solvents(s), selected from among terpenes, constitute the active ingredient of the gel according to the invention. They make possible the dissolution of the organic materials in the contaminated surface layer.

Thanks to the intrinsic properties of the specific solvent(s) of the gel according to the invention, which are terpenes, the gel according to the invention makes it possible to:
completely dissolve a contaminated organic matrix, for example in the form of spots/patches, which then is found to be incorporated, in the same way as the contamination, in the final solid waste, that is to say the gel after drying which is in the form of suctionable flakes.
attack by dissolving a surface organic layer contaminated for example over a few microns and allow the incorporation of the dissolved layer and contaminants present within the gel and thus in the final solid waste that is to say the gel after drying.

This/these solvents(s) of the gel according to the invention, selected from among terpenes is (are) little (or not) toxic, harmful.

In other words, according to the invention, care has been taken to ensure that the solvents(s) of the gel are specifically selected from among solvents that are the least toxic, and the least harmful, or indeed non-toxic, and not harmful, in order to protect the operators who operationally implement the gel according to the invention.

This again is another characteristic feature that fundamentally differentiates the gel according to the invention from the numerous gels mentioned in the prior art in which solvents, for example, toxic or harmful gasolines, are operationally implemented.

This/these one or more terpene solvent(s) of the gel according to the invention are in addition solvents which give off an odour which is little or not nauseating, or unpleasant.

In other words, the greatest care has been taken to ensure that the solvents of the gel according to the invention are selected from among solvents whose odour is the least nauseating, the least unpleasant, or indeed not at all nauseating or unpleasant.

To put it another way, the solvents of the gel according to the invention are selected from among solvents which give off a very limited "stench" or even none at all.

The solvent or the mixture of terpene solvent(s) of the gel according to the invention in addition generally has a volatility that is compatible with a good drying time for the gel, that is to say a volatility which ensures a drying rate that is not too high, and therefore a drying time that is sufficient so as to ensure at least a partial dissolution of the organic material of the layer, an absorption of the contamination, for example a drying time of around 20 hours.

The presence of ethanol in the gel makes it possible, if it is so desired, to reduce the drying time, for example to around 5 hours.

The majority of the terpenes mentioned here above have a low volatility, are little volatile and therefore make it possible, when used alone in the gel according to the invention to obtain a sufficient drying time, for example a drying time of around 20 hours.

Again, the presence of ethanol in the gel, in combination with one or more low volatility terpenes, makes it possible, if it is so desired, to reduce the drying time to around 5 hours.

However, certain of the terpenes mentioned here above have a high volatility, provide gels that dry too quickly, and when they are used alone in the gel according to the invention, do not serve to obtain a sufficiently substantive drying time, this is for example the case with ocimene.

These terpene solvents which have a high volatility such as ocimene are therefore generally used in combination, in admixture with another terpene solvent (such as limonene) which has a low volatility, in order to obtain a sufficient drying time.

It is precisely the combination of such a high-volatility terpene solvent with another terpene solvent of lower volatility which makes it possible to "slow down" the drying of the gel and to reach a good drying time, a sufficient drying time.

In the same manner, it is generally necessary to ensure that the volatility of the solvent or of the mixture of terpene solvents, optionally in combination with ethanol, is such that the gel does not dry too slowly and that the drying time thereof is not too long and does not exceed, for example, 8 hours.

The man skilled in the art is able to easily identify, among the solvents of the gel according to the invention, selected from the terpenes, mentioned here above, the solvents having a low volatility, and the solvents having a high volatility in order to define a formulation having a drying time which is not too long, and not exceeding, for example, 8 hours.

The man skilled in the art moreover also knows that ethanol is a solvent which has a high volatility.

A preferred gel according to the invention consists of a colloidal solution comprising, preferably consists of, from 35% to 98% by weight, preferably 60% to 85% by weight, for example 70% by weight, based on the total weight of the gel, of one or more terpene(s) selected from among, for example, d-limonene, l-limonene, alpha-pinene or beta-pinene, from 1% to 25% by weight, preferably 5% to 20% by weight, for example 10% by weight, based on the total weight of the gel, of an inorganic viscosifying agent, preferably selected from among aluminas, and from 1% to 40% by weight, preferably 10% to 20% by weight, for example 19 to 20% by weight, based on the total weight of the gel, of ethanol.

In a surprising manner, and although the organic solvents of the gel according to the invention, which are terpenes, are selected from among the solvents that are little (or even non) toxic, harmful, these solvents alone or in admixture however present a high effectiveness for dissolving the material of the organic layer containing the contamination, for example the radioactive contamination, regardless of what this material is, for example resin paint or other.

In other words, the solvent of the gel according to the invention which is selected from terpenes, is relatively low in toxicity and possesses strong dissolving properties vis-à-vis organic materials as well as degreasing properties.

The terpenes may be selected in particular from among terpene hydrocarbons, oxygenated terpene compounds, and isomers, in particular optical isomers thereof.

The one or more terpene(s) of the gel is (are) also selected based on the nature of the organic material which constitutes the contaminated layer in a manner so as to provide for the most effective dissolution of this material.

The term 'terpenes' is also understood to include isomers, in particular the optical isomers thereof.

Among the terpenes that may be mentioned in particular are ocimene, α-pinene, β-pinene, limonene, menthol, menthone, terpineol, isoborneol, camphor, nerol, citronellal, citronellol, myrcene, myrcenol, linalool, geraniol, and isomers in particular optical isomers thereof.

The gel according to the invention comprises, as an organic solvent selected from among terpenes, preferably as the only organic solvent selected from among terpenes, d-limonene.

Indeed, d-limonene possesses, among all terpenes, the best solubilisation power vis-à-vis organic materials, especially vis-à-vis bitumens.

A particularly preferred gel according to the invention comprises from 35% to 94% by weight, preferably from 65% to 83% by weight, even more preferably from 70% to 80% by weight, for example 67% by weight, based on the total weight of the gel, of d-limonene, and from 1% to 40% by weight, preferably from 10% to 20% by weight, for example from 19% to 20% by weight, based on the total weight of the gel, of ethanol that makes it possible to adjust the drying time.

The gel according to the invention meets the needs enumerated here above, it makes it possible, in particular while being suctionable, to eliminate a contamination, for example a radioactive contamination, contained in a layer of an organic material.

In particular, the gel according to the invention makes possible the effective decontamination of surfaces composed of organic materials, of such types as paint or epoxy resin or else of surfaces soiled with contaminated organic materials such as bitumen or oil spots/patches.

In contrast to the gels mentioned in the prior art, the gel according to the invention, by virtue of the specific solvents it contains, ensures the decontamination, for example the radiological decontamination, by complete or partial dissolution of the organic material containing the contaminants, for example the radioactive contaminants, and the incorporation of the dissolved organic material containing the contaminants, for example the radioactive contaminants, within the gel.

The gel according to the invention has the same effectiveness, whether the treated layer is a contaminated surface layer of a solid substrate consisting of a contaminated organic material, or else whether the treated layer is a layer consisting of a contaminated organic material such as a layer forming a coating on a surface of a substrate, or else also whether the treated layer is a layer consisting of a contaminated organic material, that is found on a surface of a substrate, this layer being in particular in the form of a spot/patch of contaminated organic material soiled the said surface, for example a spot/patch of oil or bitumen or contaminated grease that soils said surface.

In this latter case where the treated layer is present in particular in the form of a spot/patch of contaminated organic material soiling a surface, the gel according to the invention has excellent effectiveness regardless of the material of this surface and irrespective of the surface state of the said surface, whether this surface is smooth, rough, dense or porous. The examples provided below show that the gel according to the invention is just as effective for decontaminating a dense epoxy resin surface, as a porous concrete surface, by eliminating from this surface a contaminated bitumen spot/patch.

The gel according to the invention serves to bring about a migration of the contaminants, of the contamination, for example of the radioactive contamination, present in the contaminated organic layer into the gel and, as a consequence thereof, into the final solid waste consisting of the dry gel, in order to decontaminate the said organic layer.

The gel according to the invention, as has already been indicated here above, is a suctionable gel which has all the advantageous properties—mentioned here above—inherent to the gels referred to as suctionable gel such as the gels mentioned in the documents [1], [2], [6], [7] and [4] with the fundamental difference, however, that with the gel according to the invention, elimination is brought about of a contamination, such as a radioactive contamination, contained in a surface layer made of an organic material and that the composition of the gel is therefore adapted as a consequence thereof.

As has previously been indicated above, the gels mentioned in these documents [1], [2], [6], [7], are aqueous gels specifically designed for the elimination of a radioactive or biological contamination that is found at the surface of a substrate, and whereof the solvents and the active decontamination agent are totally different from those of the gel according to the invention.

There is no indication in the documents [1], [2], [6], and [7], which could lead the man skilled in the art to modify in such a substantial manner the gels mentioned in these documents in order to use them to eliminate a contamination, for example a radioactive contamination, contained in a surface layer made of an organic material.

In the same manner, the gel mentioned in the document [4] is a gel specifically designed for the removal of graffiti that contain no contamination, in particular no radioactive contamination, on the surface of a substrate.

The gel mentioned in the document [4] simply has an action of dissolving the graffiti and not an action of transfer, migration into the gel, of a contamination, for example of a radioactive contamination, contained in the gel.

There is no indication in the document [4] that could lead the man skilled in the art to modify the gel mentioned in this document in order to use it for a contamination, for example a radioactive contamination, contained in a surface layer made of an organic material.

The gel according to the invention is a colloidal gel whose active ingredient makes possible the total or partial dissolution of the organic material, and whose rheology is suitable for application, preferably by means of spraying on to the surfaces to be treated.

Therein lies one of the advantages of the gel according to the invention in that it has the ability to be applied very easily, by means of spraying.

The gel according to the invention dries progressively, prolonging the time of contact between the stripping, dissolving active agent, that is to say the solvent and the organic material, for example the paint, and forms flakes which are easily detached from the surface by means of brushing/suction—hence the nomenclature of suctionable gel—thus carrying away the contamination, for example the radioactive contamination, and the dissolved organic material. In the case where the layer of organic material is present in the form of a spot, patch or discrete spots, patches of contaminated organic material soiling the surface of a solid substrate, for example in the form of contaminated oil or bitumen spots, patches which soil the surface of the solid substrate, this is achieved without the material of the solid substrate being altered.

The cleaning operator can thus let the gel act on the surfaces to be treated while going to treat other surfaces, without having to be physically present during the drying, or scrubbing the surface laboriously with the use of a solvent.

In summary, the gels according to the invention therefore meet all of the needs mentioned here above, and they present all of the known advantageous properties of gels referred to as "suctionable" gels.

In other words, the combination—which may be described as synergistic—of one or more inorganic viscosifying agent(s) with the specific solvent of the gel according to the invention selected from terpenes and mixtures thereof, makes it possible to obtain a gel possessing rheological properties, as well as properties of: dissolution of the organic material, absorption, migration of the contamination, for example of the radioactive contamination, into the gel, and of excellent drying, the dry gel in addition being easily suctionable.

The gel according to the invention, although it contains a viscosifying agent generally exclusively inorganic, mineral, with no organic, viscosifying agent, may be qualified as an organic gel.

Indeed, the organic matter content of the gel according to the invention is high, at least equal to 70% by weight, for example equal to 90% by weight, because it contains at least 70% by weight, for example 90% by weight of organic solvents.

The gel according to the invention is a colloidal solution, which means that the gel according to the invention contains mineral, inorganic solid particles, of the viscosifying agent whose primary elementary particles, generally have a size from 2 to 200 nm. These mineral inorganic solid particles play the role of a viscosifier in order to enable the solution to gel and thus adhere to the surface to be treated, regardless of the geometry, shape, and size thereof, and irrespective of where the layers to be treated are found.

Advantageously, the inorganic viscosifying agent may be selected from among metal oxides such as aluminas, metalloid oxides such as silicas, metal hydroxides, metalloid hydroxides, metal oxyhydroxides, metalloid oxyhydroxides, aluminosilicates, clays such as smectite, and mixtures thereof.

In particular, the inorganic viscosifying agent may be selected from among aluminas ($Al_2O_3$) and silicas ($SiO_2$).

The inorganic viscosifying agent may comprise only one single silica or alumina or a mixture thereof, that is to say a mixture of two or more different silicas ($SiO_2/SiO_2$ mixture), a mixture of two or more different aluminas ($Al_2O_3/Al_2O_3$ mixture), or even a mixture of one or more silica(s) with one or more alumina(s) ($SiO_2/Al_2O_3$ mixture).

Advantageously, the inorganic viscosifying agent may be selected from among pyrogenic silicas, precipitated silicas, hydrophilic silicas, hydrophobic silicas, acidic silicas, basic silicas such as the silica Tixosil® 73, marketed by the company Rhodia, and mixtures thereof.

Among the acidic silicas, mention may be made in particular of pyrogenic silicas or fumed silicas "Cab-O-Sil"® M5, H5 or EH5 silica, marketed by the company CABOT, and pyrogenic silicas marketed by the company EVONIK INDUSTRIES under the trade name AEROSIL®.

Among these pyrogenic silicas, preference would be given to the silica AEROSIL® 380 having a specific surface area of 380 m²/g, which offers the maximum viscosifying properties for a minimal mineral load.

The silica used may also be a silica referred to as precipitated silica obtained for example by means of wet processing by admixing a solution of sodium silicate and of an acid. The preferred precipitated silicas are marketed by the company EVONIK INDUSTRIES under the trade name SIPERNAT® 22 LS and FK 310 or alse by the company RHODIA under the trade name TIXOSIL® 331, the latter is a precipitated silica whereof the average specific surface area is comprised between 170 and 200 m²/g.

Advantageously, the inorganic viscosifying agent consists of a mixture of a precipitated silica and a pyrogenic silica.

A particularly preferred viscosifying agent is selected from among aluminas. Indeed, it has been found that the combination of one or more aluminas with the specific solvent of the gel according to the invention selected from among terpenes and the mixtures thereof makes it possible to obtain a gel having even better rheological properties, as well as properties of dissolution of the organic material, absorption, migration of the contamination, for example of the radioactive contamination, into the gel, and of better drying, the dry gel in addition being easily suctionable.

In particular, the rheological properties of the gel are better when the gel comprises one or more aluminas as an inorganic viscosifying agent, rather than a silica or a clay, as in the gel mentioned in the document [3].

The aluminas may be selected from among calcined aluminas, milled calcined aluminas, pyrogenic aluminas, and mixtures thereof.

Pyrogenic aluminas are particularly preferred because the properties of the gel mentioned here above, and in particular the rheological properties, are even better with these pyrogenic aluminas, in particular when these pyrogenic aluminas have a fine granulometry, particle size distribution, that is to say generally from 10 nm to 100 nm.

By way of example, mention may be made of the product marketed by the company EVONIK INDUSTRIES under the trade name "Aeroxide® Alu C" which is fine pyrogenic alumina.

In an advantageous manner, according to the invention, the inorganic viscosifying agent consists of one or more alumina(s), generally representing from 1% to 25% by weight, and preferably from 5% to 25% by weight based on the total weight of the gel.

In this case, the one or more alumina(s) is (are) more preferably at a concentration of 5% to 20% by weight, better still from 7% to 15% by weight, for example 10% to 14% by weight, based on the total weight of the gel, in order to ensure drying of the gel at a temperature comprised between 20° C. and 50° C. and at a relative humidity of between 20% and 60% on average within a period of 30 minutes to 24 hours.

The nature of the mineral viscosifying agent, in particular when it consists of one or more alumina(s), in an unexpected manner influences the drying of the gel according to the invention and the granulometry, particle size distribution of the residue obtained.

In fact, the dry gel is present in the form of particles of controlled size, more precisely millimetre sized solid flakes, the size of which generally ranges from 1 to 10 mm, preferably from 2 to 5 mm, in particular thanks to the above-mentioned compositions of the present invention, in particular when the viscosifying agent consists of one or more alumina(s).

It is specifically clarified that the size of the particles generally corresponds to their largest dimension.

In other words, the mineral solid particles of the gel according to the invention, for example of such types as silica or alumina, in addition to the viscosifying role thereof, also play a fundamental role during the drying of the gel because they ensure the fracturing of the gel in order to achieve a dry waste in the form of flakes.

A particularly preferred gel according to the invention consists of a colloidal solution comprising, ie preferably consisting of:

1% to 25% by weight, preferably 5% to 25% by weight, more preferably 5% to 20% by weight, better yet 7% to 15% by weight, for example 10% to 14% by weight, based on the total weight of the gel, of at least one alumina, preferably at least one pyrogenic alumina, more preferably at least one pyrogenic alumina having a fine granulometry, particle size distribution;

35% to 94% by weight, preferably 65% to 83% by weight, more preferably 70% to 80% by weight, for example 67% by weight based on the total weight of the gel, of d-limonene;

from 1% to 40% by weight, preferably from 10 to 20% by weight, for example 19% to 20% by weight, based on the total weight of the gel, of ethanol.

Again, quite obviously, the sum of the percentages by weight of all of the components, constituting the gel is 100% by weight.

Such a gel in an unexpected manner possesses a particularly advantageous combination of properties, that is to say an excellent effectiveness, especially an excellent solubilising power for solubilisation of organic materials, due essentially to d-limonene, and excellent rheological, drying, and form of dry residues properties due to the alumina, in particular pyrogenic allumina.

The addition of ethanol also makes it possible to adjust the drying time at will.

The gel according to the invention may also contain, optionally, at least one dye and/or at least one pigment.

Advantageously, the pigment is a mineral pigment. In this regard, reference may be made to the document WO-A1-2014/154817.

There is no limitation with respect to the mineral pigment that is incorporated in the decontamination gel according to the invention.

Generally, the mineral pigment is selected from among mineral pigments that are stable in the gel.

The term 'stable pigment', is generally understood to indicate that the pigment does not exhibit a stable change in its colour over time, during storage of the gel for a minimum period of 6 months.

There is no limitation with respect to the colour of this pigment, which is generally the colour that it will transfer to the gel. This pigment may be black, red, blue, green, yellow, orange, violet, brown, etc, and even white in colour.

Generally, the gel therefore has a colour that is identical to the colour of the pigment that it contains. It is possible, however, for the gel to have a colour that differs from the colour of the pigment that it contains but this is not wanted.

The pigment, in particular when it is white, is generally different from the inorganic viscosifying agent.

Advantageously, the mineral pigment is selected in a manner such that it gives the gel (that is to say, to the gel in the wet state, before drying) a colour that is different from the colour of a surface to be decontaminated on which the gel is applied.

Advantageously, the inorganic pigment is a micronised pigment, and the average size of the particle of the inorganic pigment may be from 0.05 to 5 µm, preferably from 0.1 to 1 µm.

The fact that the pigment is micronised serves the purpose of preventing it from altering the rheology of the gel and its ability to be sprayed ("sprayability") because the pigment thus then has the same micrometric size, which is generally that of the inorganic viscosifying agent, such as alumina aggregates.

Advantageously, the mineral pigment is selected from among the metal(s) and/or metalloid(s) oxides, the metal(s) and/or metalloid(s) hydroxides, the metal(s) and/or metalloid(s) oxyhydroxides, the ferrocyanides and the ferricyanides of metal(s), the aluminates of metal(s), and the mixtures thereof.

Preferably, the inorganic pigment is selected from iron oxides, preferably micronised iron oxides, and mixtures thereof.

The iron oxides may have different colours, for example, they may be yellow, red, purple, orange, brown, or black.

Indeed, iron oxide pigments are known to have good hiding power and high resistance to acids and bases.

For incorporation into a decontamination gel, the iron oxides have the best performance in terms of stability and colouring power. Thus, an iron oxide content of 0.1% or even 0.01% by weight is sufficient to strongly colour the gel without altering its properties.

As has already been mentioned here above, the fact that the iron oxide pigment is preferably micronised serves the purpose of preventing it from altering the rheology of the gel and its ability to be sprayed ("sprayability") because the pigment thus then has a micrometric size, that is to say a size which is generally that of the inorganic viscosifying agent, such as the alumina aggregates.

Micronised iron oxides are available from the company Rockwood® under the trade name Ferroxide®.

Mention may be made among others of Ferroxide® 212 M, which is a micronised red iron oxide with a mean particle size of 0.1 µm, and Ferroxide® 228 M, which is a micronised red iron oxide with an mean particle size of 0.5 µm.

In addition to and/or instead of iron oxides, other coloured oxides or hydroxides of metals or metalloids may be incorporated within the gel according to the invention, depending on the pH of the gel, mention may be made in particular of vanadium oxide ($V_2O_5$) which is orange, manganese oxide ($MnO_2$) which is black, cobalt oxide which is blue or green, and rare earth oxides. However, the iron oxides are preferred for the reasons specified here above.

Among the oxyhydroxides, mention may be made of goethite, that is to say, iron oxyhydroxide FeOOH, which is highly coloured.

By way of an example of metal ferrocyanide, mention may be made of Prussian blue, that is to say ferric ferrocyanide, and by way of an example of aluminate, mention may be made of cobalt blue, that is, cobalt aluminate.

The incorporation within the gel according to the invention of a mineral pigment makes it possible to better view the wet gel and then the dry residues regardless of the substrate on which the gel is applied.

The gel may optionally contain, in addition, at least one surfactant (that is to say, a single surfactant or a mixture of surfactants), preferably this or these surfactant(s) is (are)

selected from among non-ionic surfactants such as block copolymers, like block copolymers of ethylene oxide and propylene oxide, and ethoxylated fatty acids; and the mixtures thereof.

For this type of gel, the surfactants are preferably block copolymers marketed by the company BASF under the trade name PLURONIC®.

Pluronics® are block copolymers of ethylene oxide and propylene oxide.

These surfactants influence the rheological properties of the gel, especially the thixotropic nature of the product and the time for recovering the viscosity thereof, and also prevent the appearance of running off.

Moreover, the surfactants also make it possible to control the adhesion of the dry waste, and to control the size of the dry residue flakes in order to ensure that the waste is non-pulverulent.

The gel may optionally further contain, from 0.1% to 10% by weight, preferably 1% to 5% by weight, based on the total weight of the gel, of at least one extracting agent for extracting the contaminant species, for example at least one extracting agent for extracting radionuclides, preferably selected from zeolites and clays.

This optional extractant agent such as a zeolite or a clay may be used in the case where the contaminant species is a radionuclide, but this optional extractant agent may also be used in the case of contaminant species other than radionuclides, such as for example metals, such as toxic metals or heavy metals.

The invention also relates to a method for eliminating a contaminant species, for example a radioactive contaminant species, contained in a layer consisting of an organic material on the surface ("en surface") of a solid substrate, in which at least one cycle is carried out comprising the following successive steps:
  a) applying the gel according to the invention, as has been described here above, on to said layer consisting of an organic material;
  b) maintaining the gel on the layer consisting of an organic material at least for a period of time that is sufficient in order for the gel to: dissolve partly or totally, the organic material of the layer consisting of an organic material; absorb the contaminant species, for example the radioactive contaminant species (in order for the contaminant species to migrate into the gel); and in order for the gel to dry and form a dry, solid, and non-pulverulent (non-powdery) residue containing the organic material of the layer consisting of an organic material that has been dissolved, and the contaminant species, for example the radioactive contaminant species;
  c) eliminating the dry and solid residue containing the organic material of the organic layer that has been dissolved, and the contaminant species, for example the radioactive contaminant species.

There is no limitation with respect to the contaminant species that can be eliminated by the method according to the invention, in particular with regard to its shape, form and chemical composition. Thus, the contaminant species that can be eliminated by the method according to the invention may be an organic or inorganic (mineral) species.

The contaminant species that can be eliminated by the method according to the invention may be a solid or liquid contaminant species.

The contaminant species that can be eliminated by the method according to the invention may be in particular a contaminant species that is radioactive, and/or chemically toxic, and/or toxic on account of its shape, form and/or of its size.

The contaminant species that is toxic on account of its shape, form and/or of its size, may be a contaminant species that is in the form of solid particles such as microparticles, or nanoparticles, for example in the form of fibres such as microfibres or nanofibres, in the form of nanotubes, or in the form of crystals such as nanocrystals.

These fibres may form a wool, such as a glass wool or wool referred to as rock wool.

The toxic contaminant species may especially be present in the form of a dust.

It is to be noted that certain dusts of chemically non-toxic compounds, for example dust from cereals or wood are toxic by virtue of the sole fact that they are precisely in this form of dust.

The contaminant species may be selected from among metals and metalloids in the form of a metal, a metalloid, or in ionic form, preferably from among metals referred to as "heavy metals", and toxic metals and metalloids in the form of a metal, a metalloid, or in ionic form; the compounds of these metals and metalloids such as organometallic compounds, metal salts, metal oxides, metal carbides, etc; ceramics; and glasses for example in the form of glass wool.

For the purposes of the invention, the metals referred to as "heavy metals" are understood to include all the elements traditionally designated by this term as well as the elements designated by the term metallic trace elements, or MTEs.

The metals referred to as "heavy metals", and the toxic metals and metalloids are in particular antimony, arsenic, cadmium, chromium, copper, lead, mercury, nickel, selenium, tellurium, thallium, and tin.

The contaminant species in particular may be asbestos.

The radioactive contaminant species may be any chemical compound containing a radionuclide, whether it be in ionic, molecular or particulate form.

According to a first variant, the layer consisting of an organic material containing a contaminant species, for example a radioactive contaminant species, may be a surface layer, of a solid substrate consisting of the said (the same) organic material (as the layer).

In other words, according to this first variant, the surface layer is an integral part of the substrate.

This surface layer generally has a thickness of 1 to 10 μm.

This organic material may be selected from among paints, lacquers, organic polymers, and organic resins such as epoxy resins.

This solid substrate consisting of an organic material may be a bulk, solid, substrate or a layer, such as a layer of paint or of epoxy resin, for example a layer of paint or of epoxy resin forming a coating on a surface of a substrate.

Or else, according to a second variant, this layer consisting of an organic material containing a contaminant species, for example a radioactive contaminant species, may be a layer consisting of an organic material containing a contaminant species, for example a radioactive contaminant species, that is found on a surface of a solid substrate, this layer may be present in the form of a continuous layer, or may be present in the form of a spot, patch or discrete spots, patches of the organic material containing a contaminant species, for example a radioactive contaminant species.

In this second variant, the layer, for example the spot, patch or discrete spots, patches, of the organic material containing a contaminant species, for example a radioactive contaminant species, is (are) completely dissolved by the gel.

In this second variant, the organic material (of the layer) may be selected from sticky organic materials.

The sticky organic materials are well known to the man skilled in the art, who has no difficulty in determining among the organic materials those that are sticky, and adhere to a surface on which they are located.

In the present document, sticky organic materials are generally defined as materials that cannot be eliminated from a surface on which they are found by a simple suction operation.

The organic material may be selected in particular from oils such as hydrocarbon oils, bitumens, tars and greases.

In this second variant, the solid substrate may be a porous substrate, preferably a porous mineral substrate, or a non-porous substrate.

The effectiveness of the gel and of the method according to the invention is just as good in the presence of a non-porous and/or non-mineral surface as in the presence of a porous and/or mineral surface. Regardless of the type of solid substrate (whether or not porous, mineral), the spot/patch or discrete spots/patches of the organic material containing a contaminant species, for example a radioactive contaminant species, is (are) completely dissolved by the gel (see examples).

Advantageously, in this second variant, the substrate is made of at least one material selected from among metals and alloys such as stainless steel, galvanised steel, or zinc; painted steels; organic polymers such as plastic materials or rubbers such as poly(vinyl chloride)s or PVC, polypropylenes or PPs, polyethylenes or PEs, in particular high density polyethylenes or HDPEs, poly (methyl methacrylate)s or PMMA, poly (vinylidene fluoride)s or PVDF, polycarbonates or PCs; glasses; cementitious materials such as pastes, cements, mortars and concretes; plasters; bricks; tiles; raw earth or terracotta; natural or artificial stones; coatings; fibreglass, fibro-cements; asphalt; tar; slate; cellulose-based materials such as wood; and ceramics.

The substrate may be painted or not.

Advantageously, the gel is applied on to the surface layer in a proportion of 100 g to 10000 g, preferably from 500 g to 5000 g, more preferably from 500 to 1500 g of gel per $m^2$ of surface area, better still from 600 to 1000 g of gel per $m^2$ of surface area, which generally corresponds to a thickness of gel deposited on the surface from 0.1 mm to 1 cm, preferably from 0.5 mm to 5 mm.

Advantageously, the gel is applied on to the surface layer by means of spraying, with a brush or with a trowel.

Advantageously (during step b)), the drying is carried out at a temperature of 1° C. to 50° C., preferably from 1° C. to 40° C., more preferably from 15° C. to 25° C., and at a relative humidity of 20% to 80%, preferably from 20% to 70%.

Advantageously, the gel is maintained on the surface layer for a period of 2 hours to 72 hours, preferably from 4 to 48 hours, more preferably from 6 to 24 hours.

Advantageously, the dry and solid residue is in the form of particles, for example flakes, of a size of 1 to 10 mm, preferably from 2 to 5 mm.

Advantageously, the dry and solid residue is eliminated from the surface of the solid substrate by means of brushing and/or suctioning (aspiration).

Advantageously, the cycle described here above may be repeated for example from 1 to 10 times, by using the same gel during all the cycles or by using different gels during one or more cycle(s).

Advantageously, during step b), the gel, before total drying, is rewetted with a solvent, preferably with the solvent of the gel applied during the step a), which then generally serves to avoid repeating the application of the gel on the surface and brings about a saving in reagent and a limited amount of waste. This rewetting operation may be repeated for example from 1 to 10 times.

The method according to the invention has all of the advantageous properties inherent in the decontamination gel that it implements and which have already been largely discussed here above.

The method according to the invention makes it possible to eliminate the contaminant species, for example the radioactive contaminant species, contained in a surface layer made of an organic material while being far less tedious, cumbersome, and much less expensive than the conventional methods and processes used previously for this purpose, that is to say, notably:

methods, processes implement high pressure means, which are "technical" (complex) and expensive;

methods, processes that operationally implement wipes soaked in harmful solvents the use whereof is long and laborious.

Thus, the gel according to the invention may be sprayed by making use of a simple commercially available paint gun whereas sand blasting devices, for example, require adjustments and special training. These sand blasting devices are complex and their maintenance is expensive.

In addition, the method according to the invention is a method that uses dry processing which thus avoids spillage of dissolvent or stripper while optimising the working time of the cleaning operator. Indeed, the latter is capable of treating multiple zones at a time rapidly, on account of the drying time of the gel and of the implementation thereof advantageously by means of spraying.

In summary, the method and the gel according to the invention have, among other things, in addition to the advantageous properties specifically due to the specific solvent contained in the gel, the other advantageous properties as follows:

the application of the gel preferably by means of spraying. The spraying makes it possible to quickly and easily treat large surface areas and requires fewer operators;

adhesion to walls;

obtaining of the maximum effectiveness with respect to elimination of the contamination upon conclusion of the phase of drying of the gel, including in the case of contaminated spots/patches penetrating into the substrate, especially in the case of porous surfaces.

In general, it is so ensured that the drying time is greater than or equal to the time necessary to eliminate the surface layer or the spots/patches. In the case of a deep contamination, it is sometimes necessary to use a rewetting step.

the treatment of a very wide range of materials (see examples);

the absence of mechanical or physical alteration of the materials of the solid substrate at the conclusion of the treatment;

the implementation of the method under variable climatic conditions (see examples);

the reduction in the volume of waste;

the ease of recovery of the dry waste.

The examples provided below show in particular that the gel according to the invention by virtue of the specific formulation and the implementation thereof being simple, reliable and easy, is effective in particular for the elimination of a large variety of contaminated spots, patches over a wide variety of materials.

Other characteristic features and advantages of the invention will become more clearly apparent upon reading the detailed description which follows, this description being provided merely for illustrative purposes and without limitation, in conjunction with the accompanying drawings.

DETAILED DESCRIPTION OF PARTICULAR EMBODIMENTS

Figure 1:
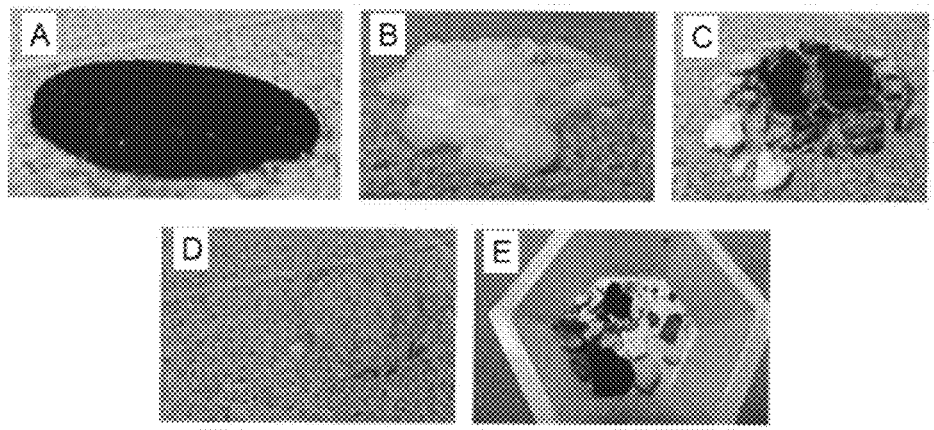
FIG. 1 (A, B, C, D, E) presents photographs that show the elimination of a bitumen spot/patch on a dense, smooth surface, as has been carried out in Example 2, by using the gel according to the invention, referred to as gel "Limo-1" prepared in Example 1.

The gel according to the invention can be easily prepared at ambient temperature.

For example, the gel according to the invention may be prepared by adding, preferably progressively the inorganic viscosifying agent(s), for example the alumina(s) and/or the silica(s), to the terpene solvent(s) optionally mixed with ethanol, or to the mixture of the organic solvent(s) (optionally with ethanol) and the optional adjuvant(s).

The optional adjuvants are generally the surfactant(s), the dye(s) and/or pigment(s), and the extracting agent(s) for extracting the contaminant species, for example, the extracting agent for extracting radionuclides.

This admixture of the solvent(s) and the optional adjuvant (s) may be prepared by mechanical agitation, for example by means of a mechanical agitator equipped with a three blade impeller. The rotational speed is, for example, 200 revolutions per minute (rpm), and the duration of the agitation is for example 3 to 5 minutes.

The addition of the inorganic viscosifying agent(s) to the solvent(s), or to the mixture of the solvent(s) and of the optional adjuvant (s) may be effected by simply pouring the viscosifying agent(s) into said solvent(s) or into said mixture.

During the adding of the inorganic viscosifying agent(s), to the solvent(s), or to the mixture of the solvent(s) and of the optional adjuvant(s), this or these solvent(s) or this mixture are generally maintained under mechanical agitation.

This agitation may be, for example, carried out by means of a mechanical agitator equipped with a three blade impeller.

The speed of agitation is generally increased gradually as the viscosity of the solution increases, so as to finally reach a speed of agitation, for example, comprised between 400 and 600 revolutions/minute, without there being any projections.

After the end of the addition of the mineral viscosifying agent(s), the agitation is continued, for example for a period of 2 to 5 minutes, in a manner so as to obtain a perfectly homogeneous gel.

It is indeed obvious that other preparation protocols for preparing the gels used according to the invention may be operationally implemented with the addition of the gel components in an order that is different from the one mentioned here above.

Generally, the gel used according to the invention should have a viscosity of less than 200 mPa·s under a shear of 1000 $s^{-1}$ in a manner so as to enable the spraying on the surface to be decontaminated, from a distance (for example at a distance of 1 to 5 m) or in proximity (for example at a distance of less than 1 m, preferably from 50 to 80 cm). The time for recovering the viscosity of the gel should generally be less than one second and the viscosity under low shear greater than 10 Pa·s in order for it to not run-off over a wall.

It should be noted that the optional surfactant of the gel according to the invention favourably and significantly influences the rheological properties of the gel used according to the invention. This surfactant in particular makes it possible for the gel used according to the invention to be implemented by means of spraying and avoids the risk of spreading or running-off during the treatment of vertical surfaces and ceilings. This surfactant also makes it possible to limit the phenomenon of bleeding observed during the storing of the gel.

The gel thus prepared is then applied on to the surface layer containing a contaminant species, for example a radioactive contaminant species, to be treated.

According to the second variant of the method according to the invention, this surface layer containing a contaminant species, for example a radioactive contaminant species, is a layer that is found on a surface of a solid substrate, this layer being present in the form of a spot/patch or discrete spots/ patches of the organic material containing a contaminant species, for example a radioactive contaminant species.

In this second variant, there is virtually no limitation with respect to the material which constitutes the substrate, in fact the gel according to the invention provides the ability to treat without any damage, all kinds of materials even fragile materials.

The gel according to the invention does not generate any chemical, mechanical or physical etching, erosion, alteration, of the material of the substrate treated. The gel according to the invention is therefore in no way detrimental to the integrity of the treated materials and indeed even enables the reuse thereof. This material of the substrate may therefore be selected from among the materials already enumerated here above, for example from among metals or alloys such as stainless steel, polymers such as plastic materials or rubbers, among which mention may be made of PVCs, Ps, PEs in particular HDPEs, PMMAs, PVDFs, PCs, glasses, cements, mortars and concretes, plasters, bricks, natural or artificial stones, coatings, ceramics.

In any case, whatever the material that constitutes the substrate, for example stainless steel, painted lacquered steel, glass, ceramic, concrete, PVC, in this second variant, the spot/patch or the discrete spots/patches of the organic material containing a contaminant species, for example a radioactive contaminant species is (are) completely dissolved by the gel.

There is also no limitation with respect to the shape/form, the geometry and the size of the layer to be treated and of the solid substrates of the first and the second variants, the gel according to the invention makes it possible to treat surfaces of large size, having complex geometries, for example having hollows, angles, recesses.

The gel according to the invention provides for the effective treatment not only of horizontal surfaces, but also of vertical surfaces such as walls, facades, bridge piers, doors, or inclined or overhanging surfaces such as ceilings.

The gel according to the invention also ensures a complete and effective elimination of the contamination regardless of the organic material of the contaminated layer and the nature of the contamination.

Compared to existing techniques which implement liquids such as solutions, the invention implements a gel, which is particularly advantageous for the treatment of materials having large surface area non-transportable, and implanted outdoors. Indeed, the method according to the invention on account of the implementation of a gel, makes possible cleaning in situ by preventing the spread of chemical solutions in the environment and the dispersion of contaminant species.

The gel according to the invention may be applied on to the surface to be treated by all the application methods known to the man skilled in the art.

The conventional methods are spraying, for example by using a spray gun, or application by means of a brush, or a trowel.

For the spray application of the gel on the surface to be treated, the colloidal solution may for example be conveyed by means of a low pressure pump, for example a pump which implements a pressure of less than or equal to 7 bars, which is about $7 \cdot 10^5$ Pascals.

The bursting of the jet of gel on the surface may be obtained for example by means of a fan/slit jet nozzle or round jet nozzle.

The distance between the pump and the nozzle may be anything, for example the distance may be from 1 to 50 m, in particular from 1 to 25 m.

The sufficiently short time for recovering the viscosity of the gels used according to the invention allows for the sprayed gels to adhere to all surfaces, for example to walls.

The quantity of gel deposited on the surface to be treated is as indicated above.

The quantity of gel deposited per unit surface area and, as a consequence, the thickness of the deposited gel influences the rate of drying.

Thus, when spraying a film, layer of gel having a thickness of 0.5 mm to 1 cm on the layer to be treated, the drying time, which is then generally the effective contact time, is sufficient for a proper treatment of the layer, leading to dissolution of the layer and to absorption of the contaminant species.

The effective time of contact is the period during which the active ingredient contained in the gel which is other than the solvent(s) will interact with the layer.

The drying time is not only related to the thickness of the layer of applied gel, but also to the climatic conditions, that is to say the relative humidity and the temperature.

The man skilled in the art can easily determine, depending on the climatic conditions, and within the thickness range mentioned here above, the thickness of the gel layer to be applied on to the surface layer so as to ensure that the gel is effective, that the layer is dissolved and that the contaminant species are absorbed by the gel.

So if it is found that relative humidity RH is 20%, and temperature is 40° C., it is possible that the drying of a layer of gel of a thickness of 0.5 mm applied on a layer would be too rapid to allow for the dissolution of this layer and the absorption of the contaminant species in the gel. On the contrary, if conditions are at 15° C., and at 50% RH, the rate of drying of a layer of the same thickness of the same gel allows for dissolution of this layer and the absorption of the contaminant species in the gel.

In addition, it has been shown in a surprising manner that the quantity of gel deposited when it is situated in the ranges mentioned here above and, in particular, when it is greater than 500 g/m$^2$ and in particular in the range of 500 at 5000 g/m$^2$, which corresponds to a minimum thickness of gel deposited, for example greater than 500 microns μm for a quantity of gel deposited greater than 500 g/m$^2$, made it possible after drying of the gel to obtain a fracturing of the gel in the form of millimetre sized flakes, for example of a size of 1 to 10 mm, preferably from 2 to 5 mm, that are suctionable.

The quantity of gel deposited and therefore the thickness of gel deposited, preferably greater than 500 g/m$^{2ت}$ that is to say 500 μm, is the fundamental parameter which influences the size of the dry residues formed after drying of the gel and which thus ensures that millimetre sized dry residues rather than pulverulent residues are formed, such residues being easily eliminated by a mechanical process and preferably by suction.

However, it should also be noted that when the gel contains a surfactant at low concentration, the drying of the gel is improved and leads to a phenomenon of homogeneous fracturing with dry residues of a mono-dispersed size and an increased ability of the dry residues to detach from the support.

The gel is then maintained on the surface to be treated for the entire duration necessary for drying thereof.

During this step of drying, which can be considered as constituting the active phase of the method according to the invention, the solvent(s) contained in the gel evaporate(s) until a dry and solid residue is obtained.

The drying time depends on the composition of the gel in the concentration ranges of its constituents given above, but also, as has already been stated, on the quantity of gel deposited per unit surface area, that is to say on the thickness of gel deposited.

The drying time also depends on the climatic conditions, that is to say on the temperature, the ventilation and the relative humidity of the atmosphere in which the solid surface is located.

The method according to the invention may be carried out under extremely broad climatic conditions, that is to say at a temperature T of 1° C. to 50° C. and at a relative humidity RH of 20% to 80%.

The drying time of the gel according to the invention is therefore generally from 15 minutes to 24 hours, preferably from 1 hour to 24 hours at a temperature T of 1° C. to 50° C. and at a relative humidity RH of 20% to 80%.

It should be noted that the formulation of the gel used according to the invention especially when it contains surfactants such as "Pluronics®" generally ensures (that is to say, in particular, generally under reasonable climatic conditions, as has been indicated here above) a drying time which is substantially equivalent to the time of contact between the gel and the surface layer that is necessary, required in order to dissolve the organic material.

In other words, the formulation of the gel ensures a drying time which is none other than the time necessary for dissolving the organic material and absorbing the contaminant species. After the drying of the gel, the gel fractures in a homogeneous manner so as to give millimetre sized solid dry residues, for example of a size of 1 to 10 mm, preferably from 2 to 5 mm, that are non-pulverulent, generally in the form of solid flakes. The solid and dry residues contain the contaminant species, for example the radioactive contaminant species, and the organic material that has been dissolved from the surface layer.

The dry residues, such as flakes, obtained at the end of the drying have a weak adhesion to the surface of the cleaned material. As a result thereof, the dry residues obtained after drying of the gel can be easily recovered by simple brushing and/or suction, aspiration. However, the dry residues can also be evacuated by a gas jet, for example by a compressed air jet.

No rinsing is generally necessary and the method according to the invention does not generate any secondary effluent.

However, a light rinsing, for example with water, of the treated surfaces, without mechanical action such as brushing, may exceptionally be necessary in order to possibly eliminate residual traces of paint and small residues of gel.

According to the invention, thus first of all a significant saving in chemical reagents is achieved as compared to a method of decontamination by washing with a solution. Then, on account of a waste in the form of a directly suctionable dry residue being obtained, an operation of rinsing with water or with a liquid is generally avoided. This very obviously results in a decrease in the quantity of effluents produced but also in a significant simplification in terms of treatment system and outlet. In particular, according to the invention, the wastes obtained at the end of the treatment are not released into the rainwater drainage networks in violation of the regulations.

Because of the composition of the gel used according to the invention, the wastes produced, once dry, represent only a small volume and are essentially minerals. They can therefore be stored or sent to a disposal system without prior treatment.

By way of example, in the common case that involves application of 1000 grams of gel per m² of treated surface, the mass of dry wastes produced is less than 300 grams per m².

The invention will now be described with reference to the following examples, given by way of non-limiting illustrations.

EXAMPLES

Example 1

In this example, a description is provided of the formulation of a gel according to the invention, referred to as gel "Limo-1", used in Examples 2 to 7.

The gel according to the invention, referred to as gel "Limo-1", is a gel whose composition is as follows:
  10% by weight of alumina;
  90% by weight of an active agent which is d-limonene.

The alumina is the alumina Aeroxide® Alu C marketed by EVONIK INDUSTRIES® which is a pyrogenic alumina with a specific surface area of 100 m²/(BET), and the d-limonene is d-limonene marketed by the company MERCK®.

This gel is prepared according to the following protocol:

The d-limonene is first weighed in a suitable container.

The d-limonene is agitated with a mechanical agitator, equipped with a three-bladed agitator, at a speed of 200 rotations/min., for a period of 3 to 5 minutes.

The alumina, in a proportion of 10% by weight, is then progressively added to the d-limonene, and agitated with the aid of the mechanical agitator. Progressively along with the addition of alumina, the viscosity of the agitated medium increases.

The rotational speed is thus also gradually increased as the viscosity of the agitated medium increases, in order to reach about 400 to 600 revolutions per minute (rpm) when the alumina has been added in its entirety, while so ensuring that there are no projections.

The gel thus prepared is finally maintained under agitation for a period of 5 minutes, and left to rest for a period of at least one hour prior to use thereof.

Example 2

This example serves to demonstrate the capacity of the gel according to the invention, referred to as gel "Limo-1", prepared in Example 1, to eliminate bitumen spots/patches, just as effectively when they are on a dense, smooth surface, as when they are on a porous surface. The bitumen spots/patches are produced by depositing on the dense, smooth surface, and on the porous surface, and under a heavy load, a small bitumen bead slightly heated in advance. The load is left for a period of 24 hrs in order to provide for a good adhesion of the bitumen spots/patches to the dense, smooth surface, and to the porous surface.

The gel according to the invention, referred to as gel "Limo-1", is then deposited, here with a spatula, in a sufficient quantity on each of the bitumen spots/patches and then allowed to dry over a period of 48 hours. Finally, the solid waste obtained upon completion of the drying is recovered by brushing.

FIG. 1 shows the results obtained on a dense, smooth epoxy resin surface.

It is observed that in one pass of the gel "Limo-1", the totality of the bitumen spot/patch could be eliminated. One pass consists of the depositing of the gel on the bitumen spot/patch, the drying of the applied gel, then followed by the brushing of the solid waste obtained at the end of the drying.

Figure 2:
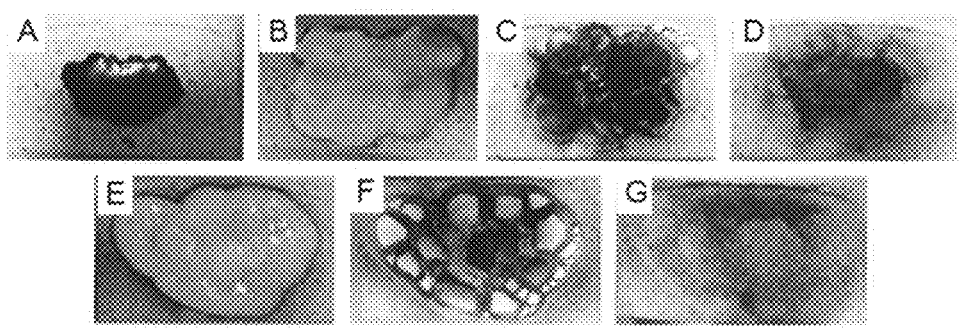
FIG. 2 (A, B, C, D, E, F, G) presents photographs that show the elimination of a bitumen spot, patch on a porous surface, as has been carried out in Example 2, by using the gel according to the invention, referred to as gel "Limo-1", prepared in Example 1.

FIG. 2 shows the results obtained on a porous surface (a concrete).

It is observed that two successive passes of the gel "Limo-1" were necessary in order to eliminate the bitumen spot/patch.

It is indeed necessary to optimise the ratio of the quantity of gel/size of the bitumen spot/patch in order to be able to reduce to the maximum extent the number of gel passes to be performed.

These results thus demonstrate the ability of a gel according to the invention to totally or almost totally eliminate an organic matrix from a dense or porous surface.

Example 3

This example provides a description of the protocol for the artificial contamination of bitumen with $^{137}$Cs, which has been developed, followed then by a description of the preparation of a dense, smooth, surface or support consisting of epoxy resin which is contaminated with an adherent spot/patch of this bitumen artificially contaminated with $^{137}$Cs.

The contamination of the bitumen was fixed at 40,000 Bq/g in order to best simulate the bitumen spots/patches present on the ground in nuclear facilities.

This protocol includes the following successive steps:
2 mL of an aqueous solution of $^{137}$Cs at about 40,000 Bq/mL are deposited at the bottom of a dish (Petri dish type) with a fairly high rim.

This solution is then allowed to evaporate. The $^{137}$Cs contamination is therefore deposited in a labile manner at the bottom of the dish.

2 grams of uncontaminated bitumen are then deposited in the dish, and this dish is then placed on a heating plate heated to 100° C. for about 1 minute. The bitumen becomes much less viscous, almost liquid, and spreads at the bottom of the dish.

The bitumen may then be slowly stirred in the dish by using a spatula, in order to integrate in a homogeneous manner into the bitumen, the $^{137}$Cs contamination deposited at the bottom of the dish, as has been described here above. The dish is held by means of insulated pliers that serve to prevent all contact between the user and the system consisting of the hotplate and the hot dish.

Small beads of the contaminated bitumen thus prepared, and still warm are then deposited on the surfaces to be contaminated.

A sheet of parchment paper (which does not stick to the bitumen) is placed on the bitumen beads thus deposited, then a light load is applied on these bitumen beads in order to flatten them as much as possible.

Finally, the same is left to cool and left to rest for a period of 24 hours.

Measurements of radiological activity, that is to say a y count are performed on each system consisting of a support, surface, and a contaminated bitumen spot/patch, before carrying out the decontamination operation.

Example 4

This example, the elimination of a bitumen spot/patch contaminated with $^{137}$Cs bonded, stuck, to a dense surface has been carried out, and thus it shows the decontamination power of the gel according to the invention, referred to as gel "Limo-1", described in Example 1, on a support, which is a dense surface contaminated with an adherent spot/patch of bitumen artificially contaminated with $^{137}$Cs.

Figure 3:
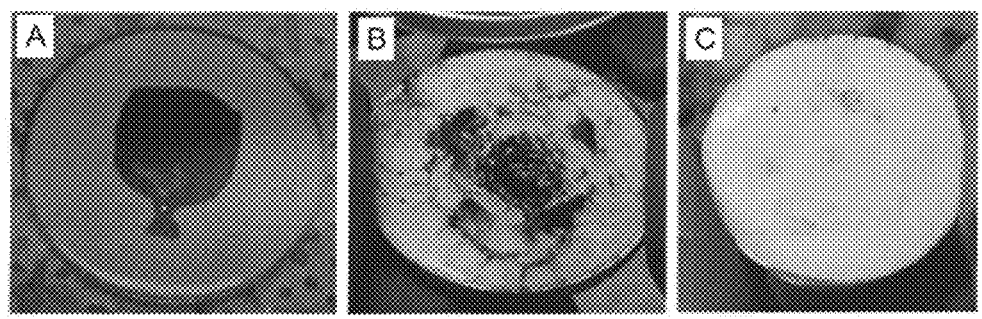
FIG. 3 (A, B, C) presents photographs that show the elimination of a spot, patch of bitumen contaminated with $^{137}Cs$ bonded, stuck, to a dense, smooth surface, as has been carried out in Example 4, by using the gel according to the invention, referred to as gel "Limo-1", prepared in Example 1.

Bitumen artificially contaminated with $^{137}$Cs is prepared, according to the protocol described in Example 3, followed then by the preparation, in accordance with Example 3, of a dense support or surface made of epoxy resin contaminated with an adherent bitumen spot/patch artificially contaminated with $^{137}$Cs (FIG. 3A). After a first counting of the radiological activity, with the help of a spatula some gel "Limo-1" is deposited on the contaminated bitumen spot/patch and then left to dry for a period of 48 hrs.

Flakes are then obtained which can be easily removed by brushing (FIG. 3B).

A second count of the radiological activity is then carried out and a first Decontamination Factor (DF) may be calculated.

It is recalled that DF=Value of the initial contamination/value of the final contamination.

A DF of 23 is thus obtained for an initial contamination of 4600 Bq.

The application of a second layer of gel makes it possible to increase this DF up to 156. Thus, only a very small contamination remains on the dense, smooth support (FIG. 3C).

The values of the radiological activity measured over the course of the decontamination operation carried out in Example 4 are summarised in Table I here below.

TABLE I

Values of radiological activity measured over the course of the decontamination operation of a dense, smooth surface.

| Gel | Limo-1 |
|---|---|
| Initial contamination (support + bitumen) (±15%) | 4600 Bq |
| Contamination after 1 gel pass (±5%) | 199 Bq |
| DF_1 | 23 |
| Contamination after 2 gel passes (±5%) | 29 Bq |
| DF_2 | 156 |

These results clearly show the effectiveness of the gel according to the invention referred to as gel "Limo-1" for the decontamination of a support with a dense, smooth surface, such as an epoxy resin support contaminated with a contaminated bitumen spot/patch.

Example 5

In this example, the elimination of a bitumen spot/patch contaminated with $^{137}$Cs bonded, stucl, to a porous surface is carried out, which thus serves to show the decontamination power of the gel according to the invention, referred to as gel "Limo-1", described in Example 1, on a porous support, surface contaminated with an adherent bitumen spot/patch artificially contaminated with $^{137}$Cs.

Bitumen artificially contaminated with $^{137}$Cs is prepared according to the protocol described in Example 3, followed then by the preparation, in accordance with Example 3, of a concrete porous support or surface contaminated with an adherent spot/patch of this bitumen artificially contaminated with $^{137}$Cs.

After a first counting of the radiological activity, with the help of a spatula some gel "Limo-1" is deposited on the contaminated bitumen spot/patch and then left to dry for a period of 48 hrs.

Flakes are then obtained which can be easily removed by brushing.

A second count of the radiological activity is then carried out and a first Decontamination Factor (DF) can be calculated.

It is recalled that DF=Value of the initial contamination/value of the final contamination.

A DF of 2 is obtained for an initial contamination of 5500 Bq.

The application of a second layer of gel makes it possible to achieve a DF of 27.

The application of a third layer of gel makes it possible to achieve a DF of 85.

Thus, only a very small amount of contamination remains on the porous support.

The values of the radiological activity measured over the course of the decontamination operation carried out in Example 5 are summarised in Table II here below.

TABLE II

Values of the radiological activity measured over the course of the decontamination operation of a porous surface.

| Gel | Limo-1 |
|---|---|
| Initial contamination (gel + bitumen) (±15%) | 5500 Bq |
| Contamination after 1 gel pass (±15%) | 2300 Bq |
| DF_1 | 2 |
| Contamination after 2 gel passes (±5%) | 205 Bq |
| DF_2 | 27 |
| Contamination after 3 gel passes (±15%) | 65 Bq |
| DF_3 | 85 |

These results clearly show the effectiveness of the gel according to the invention referred to as gel "Limo-1" for the decontamination of a support with a porous surface such as a concrete support contaminated with a contaminated bitumen spot/patch.

Example 6

This example serves to show the capacity of the gel according to the invention referred to as gel "Limo-1", to chemically attack an organic matrix such as an epoxy resin matrix.

For this purpose, an optical profilometer is used which will make it possible to characterise the surface state of an epoxy resin prior to and after application of the gel.

Figure 4:
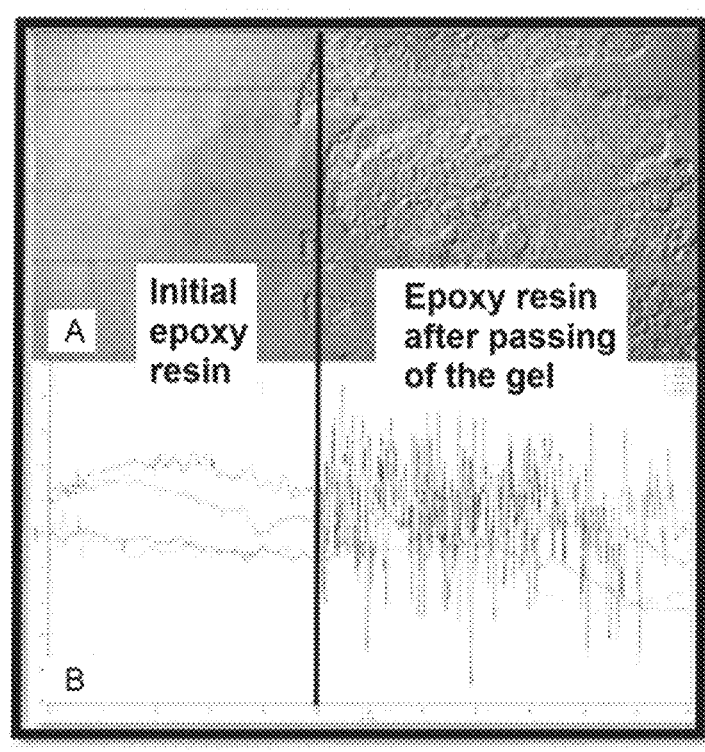
FIG. 4A illustrates Example 6, and presents a photograph of the surface of an epoxy resin prior to the deposition of a layer of gel according to the invention, referred to as gel "Limo-1", prepared in Example 1, on the surface of an epoxy resin (on the left) and after the deposition of a layer of gel, the drying of this layer and the elimination of the dry gel flakes (on the right).
FIG. 4B, illustrates Example 6, and shows the surface profiles corresponding to the surface areas photographed in FIG. 4A, prior to the deposition of a layer on the surface of the epoxy resin (on the left) and after the deposition of a gel layer, the drying of this layer and the elimination of the dry gel flakes (on the right).

FIG. 4A thus presents a photograph of the surface of an epoxy resin prior to the deposition of a layer on the surface of the epoxy resin (on the left) and after the deposition of a layer of gel, the drying of this layer, and the elimination of flakes of dry gel (on the right).

FIG. 4B shows the surface profiles corresponding to the surfaces photographed in FIG. 4A, prior to the deposition of a layer on the surface of the epoxy resin (on the left) and after the deposition of a layer of gel, the drying of this layer and the elimination of flakes of dry gel (on the right).

It is observed that the epoxy resin is clearly degraded on the right-hand portion of FIG. 4A which shows the surface obtained subsequent to the deposition, the drying and the elimination of flakes of the gel "Limo-1".

This degradation is obtained over a thickness of a few micrometres (FIG. 4B).

These results thus demonstrate that the gel "Limo-1" according to the invention attacks the epoxy resin over a thickness of a few microns.

This property will thus allow the gel according to the invention to release and then capture encrusted, embedded contaminants present under the surface (in the subsurface) of this type of organic matrices.

Example 7

In this example, it is shown that the gel according to the invention, referred to as gel "Limo-1" prepared in Example 1 can be implemented by means of spraying.

A rheological study of the gel "Limo-1" according to the invention, prepared in Example 1, has been carried out and makes it possible to show that this method is suitable and adapted to be implemented by means of spraying.

In order for this type of gel to be able to be applied according to a spraying process, it is necessary for it to possess the properties of a thixotropic, rheofluidifying fluid, with a very short time for recovering the viscosity thereof (less than one second), as well as possessing a threshold stress (typically greater than 10-15 Pa).

Various rheological measurements were carried out making use of a rheometer, the TA Instruments® AR-1000 rheometer with "Vane" geometry, and are presented in this example.

In an initial step, the viscosity of the gel was measured as a function of the shear rate.

After a pre-shearing of 5 minutes at a shear rate of 20 $s^{-1}$, then of 1 minute at 0.015 $s^{-1}$, several plateaux of shear rate ranging from 0.015 $s^{-1}$ to 100 $s^{-1}$ are carried out with a measurement of the viscosity performed every 30 seconds.

Figure 5:
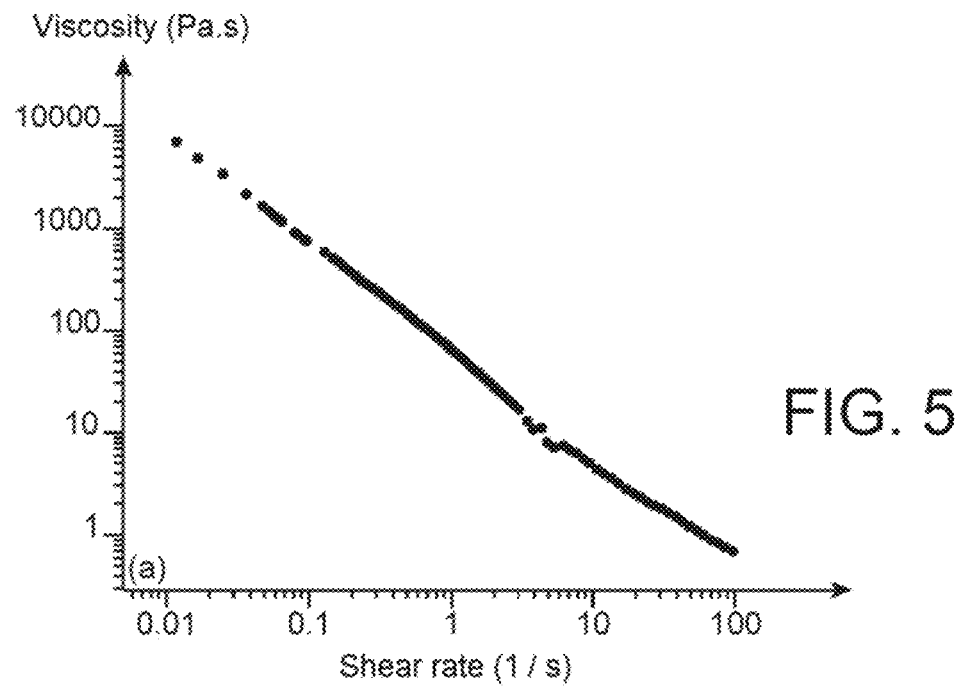
FIG. 5 is a graph which shows the evolution of the viscosity (in Pa·s) as a function of the shear rate (1/s), for the gel according to the invention, referred to as gel "Limo-1" prepared in Example 1 (see Example 7).

FIG. 5 gives the evolution of the viscosity (Pa·s) of the gel "Limo-1" according to the invention as a function of the shear rate ($s^{-1}$) for shear rates comprised between 0.015 and 100 $s^{-1}$. It is observed that there is a linear drop (in log scale) of the viscosity with the shear rate, characteristic of the behaviour of a rheofluidifying fluid with a threshold stress.

Figure 6:
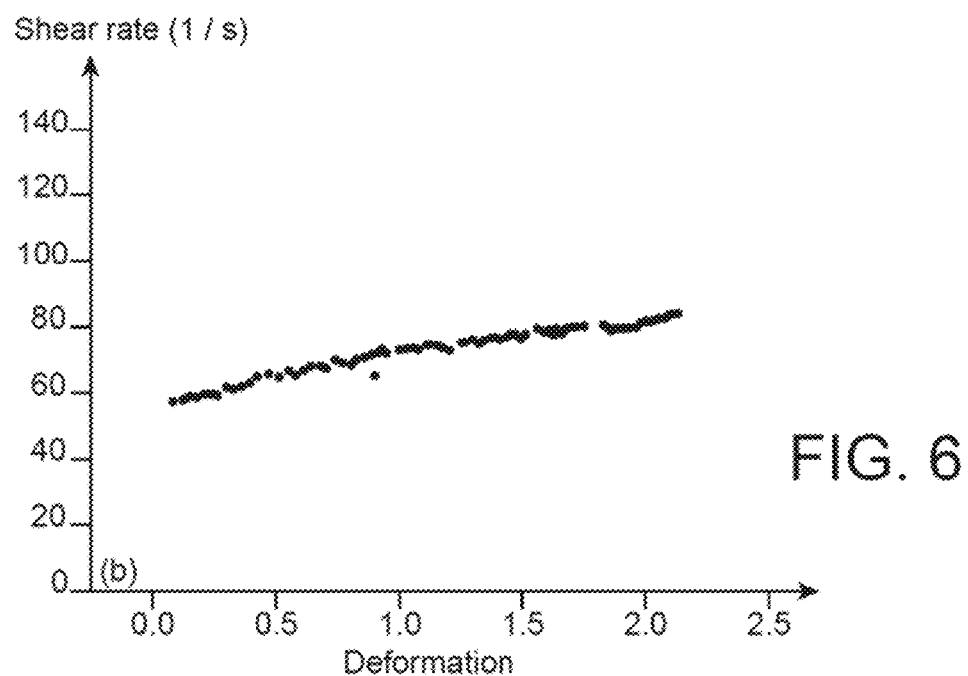
FIG. 6 is a graph which shows the evolution of the shear stress (in Pa) as a function of the deformation, strain (in Pa) for the gel according to the invention, referred to as gel "Limo-1" prepared in Example 1 (see example 7).

FIG. 6 represents the value of shear stress as a function of the deformation obtained at a shear rate imposed for the gel according to the invention, referred to as gel strain "Limo-1" described in Example 1. A low shear rate (0.015 $s^{-1}$) is applied in a constant manner in order to deform the gel starting from rest state and thus to determine the flow threshold. An already quasi-stationary flow is observed with shear stress values greater than 60 Pa. Indeed the threshold stress of the very high deformation material will therefore be much greater than 20 Pa, which will allow for the gel to hold fast on a wall for thicknesses comprised between 0 and at least 2 mm.

In conclusion, this example shows that the gel "Limo-1" according to the invention has the appropriate rheological properties that enable it to be very easily sprayable on surfaces, whether or not horizontal.

Example 8

In this example, it is shown that the gel according to the invention, referred to as gel "Limo-1" prepared in Example 1 is suctionable after the application and drying thereof.

In other words, it is intended in this example to show that the gel according to the invention, referred to as gel "Limo-1" prepared in Example 1 indeed fractures well producing non-pulverulent flakes that are millimetre sized and can be easily suctioned off.

In order to carry out this study, the gel Limo-1 is put to dry in a Binder® climatic chamber whose temperature and percentage of relative humidity are set at 25° C. and 50% respectively.

The gel is spread over a nacelle made of stainless steel machined so as to obtain a controlled thickness of 2 mm of gel in the nacelle.

In the climatic chamber, a Sartorius® precision balance is installed, as well as a Moticam® camera surrounded by a circular LED lamp (VWR) which is placed on the top of the balance.

The balance and the Moticam® camera are connected to a computer placed outside the climatic chamber, thus enabling the weight and images of the gel-filled nacelle to be acquired simultaneously during the drying in controlled atmosphere.

It should be noted that the nacelle containing the gel is placed in the precision balance and that all the doors of the balance are closed, with the exception of the door located opposite the air supply blower of the climatic chamber, which is open 3 cm, in order to maintain the controlled atmosphere in the housing compartment of the balance, while also limiting the airflow related to the operation of the climatic chamber. The recording of the weight during the drying then makes it possible to draw a curve which gives the loss in weight as a function of time and which therefore represents the drying kinetics.

Figure 7:
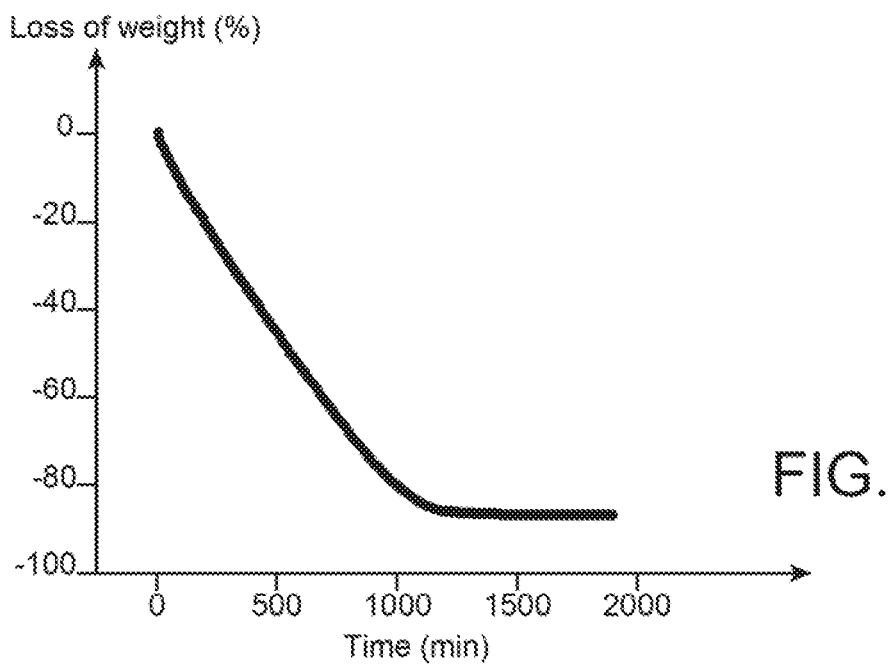
FIG. 7 is a graph which shows the evolution of the loss of mass (in %) as a function of the time (in min) of the gel according to the invention, referred to as gel "Limo-1" prepared in Example 1, deposited with a thickness of 2 mm (see Example 8).
Figure 8:
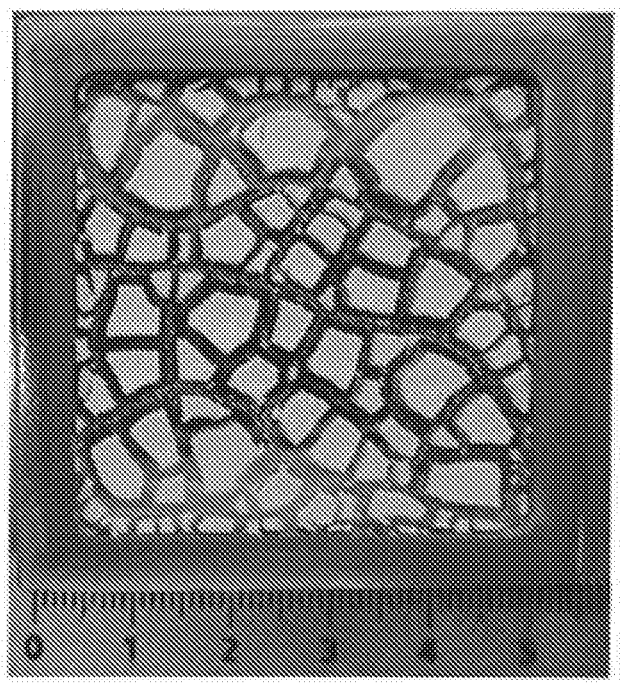
FIG. 8 is a photograph of flakes obtained after drying of the gel according to the invention, referred to as the gel "Limo-1" prepared in Example 1 (see Example 8).

The evolution of the loss in weight as a function of time is presented in FIG. 7, and a photograph showing the final size of the gel flakes is presented in FIG. 8.

It is thus observed that a thickness of 2 mm of the gel "Limo-1" dries in a few hours, more exactly in about 1200 minutes, that is 20 hours. It also appears additionally that the number of flakes formed and especially their size is indeed in conformity with the fact that these flakes are of millimetric sizes and are not pulverulent.

Example 9

In this example, the elimination of a bitumen spot/patch is carried out by making use of a gel referred to as "Limo-2" whose composition is as follows:
14% by weight of alumina
19% by weight of ethanol
67% by weight of d-limonene The alumina is the alumina Aeroxide® Alu C marketed by EVONIK INDUSTRIES® which is a pyrogenic alumina with a specific surface area of 100 $m^2/g$ (BET), and the d-limonene is d-limonene marketed by the company MERCK®. The Ethanol is marketed by MERCK®.

This gel was prepared according to the protocol described in Example 1.

A bitumen spot/patch is produced by depositing on a dense, smooth surface, and under a heavy load, a small bitumen bead slightly heated in advance. The load is left for a period of 24 hrs on the spot/patch in order to provide for the good adhesion thereof on the surface.

The gel "Limo-2" is then deposited, here with a spatula, in a sufficient quantity on the bitumen spot/patch and then allowed to dry over a period of 48 hours. Finally, the solid waste obtained upon completion of the drying is recovered by brushing.

Figure 9:
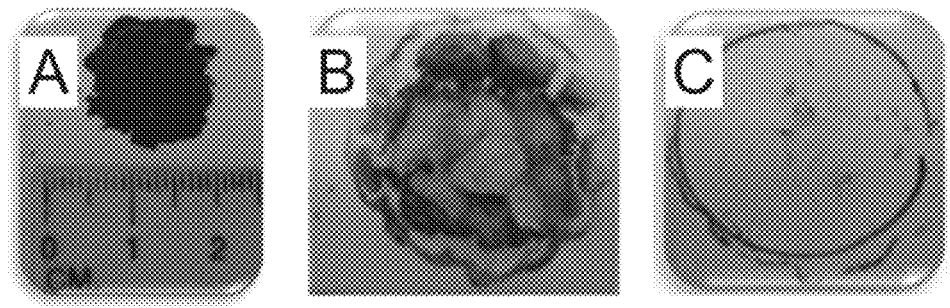
FIG. 9 (A, B, C) presents photographs that show the elimination of a bitumen spot/patch on a dense, smooth surface, as has been carried out in Example 9, by using the gel according to the invention, referred to as gel "Limo-2" prepared in Example 9.

FIG. 9 shows the result obtained on a dense, smooth surface.

It is observed that in one pass of the gel "Limo-2", the totality of the bitumen spot/patch could be eliminated.

One pass consists of the depositing of the gel on the bitumen spot/patch, the drying of the applied gel, then followed by the brushing of the solid waste obtained at the end of the drying.

REFERENCES

[1] FR-A1-2 827 530.
[2] FR-A1-2 891 470.
[3] WO-A1-99/09134.
[4] FR-A1-3 027 310.
[5] FR-A1-2 957 929.
[6] FR-A1-2962046 and WO-A1-2012/00104.
[7] FR-A1-3003763 and WO-A1-2014/154818.

The invention claimed is:

1. A suctionable gel for eliminating a contaminant species contained in a layer consisting of an organic material, on the surface of a solid substrate, consisting of a colloidal solution comprising:
    1% to 25% by weight based on the total weight of the gel, of at least one inorganic viscosifying agent consisting of one or more alumina(s);
    13% to 99% by weight, based on the total weight of the gel, of one or more organic solvent(s) selected from among the terpenes;
    10% to 20% by weight, based on the total weight of the gel, of ethanol;
    optionally from 0.01% to 10% by weight, based on the total weight of the gel, of at least one dye and/or pigment;
    optionally from 0.1% to 2% by weight, in relation to the total weight of the gel, of at least one surfactant;
    optionally, from 0.1% to 10% by weight, based on the total weight of the gel, of at least one extracting agent for extracting the contaminant species.

2. A gel according to claim 1, wherein the terpenes are selected from among terpene hydrocarbons, oxygenated terpene compounds, and isomers thereof.

3. A gel according to claim 2, wherein the isomers are optical isomers.

4. A gel according to claim 2, wherein the terpenes are selected from among ocimene, α-pinene, β-pinene, limonene, menthol, menthone, terpineol, isoborneol, camphor, nerol, citronellal, citronellol, myrcene, myrcenol, linalool, geraniol, and isomers thereof.

5. A gel according to claim 4, wherein the isomers are optical isomers.

6. A gel according to claim 4, wherein the terpene is d-limonene.

7. A gel according to claim 6, wherein d-limonene is the only organic solvent.

8. A gel according to claim 6, comprising from 35% to 94% by weight, based on the total weight of the gel, of d-limonene.

9. A gel according to claim 1, wherein the alumina(s) is (are) selected from among pyrogenic aluminas.

10. A gel according to claim 9, wherein the pyrogenic alumina has a fine particle size distribution.

11. A gel according to claim 1, wherein the alumina(s) represent(s) from 5% to 25% by weight, based on the total weight of the gel.

12. A gel according to claim 1, wherein the surfactant is selected from among non-ionic surfactants.

13. A gel according to claim 12, wherein the non-ionic surfactant is selected from the group consisting of block copolymers, ethoxylated fatty acids, and mixtures thereof.

14. A gel according to claim 13, wherein the block copolymer is selected from the group consisting of ethylene oxide and propylene oxide copolymers.

15. A gel according to claim 1, consisting of a colloidal solution comprising:
   1% to 25% by weight, based on the total weight of the gel, of at least one alumina;
   35% to 94% by weight, based on the total weight of the gel, of d-limonene.

16. A gel according to claim 15, wherein the at least one alumina is pyrogenic alumina.

17. A gel according to claim 16, wherein the pyrogenic alumina has a fine particle size distribution.

18. A gel according to claim 1, wherein the colloidal solution consists of:
   1% to 25% by weight, based on the total weight of the gel, of at least one inorganic viscosifying agent consisting of one or more alumina(s);
   13% to 99% by weight, based on the total weight of the gel, of one or more organic solvent(s) selected from among the terpenes;
   10% to 20% by weight, based on the total weight of the gel, of ethanol;
   optionally from 0.01% to 10% by weight, based on the total weight of the gel, of at least one dye and/or pigment;
   optionally from 0.1% to 2% by weight, in relation to the total weight of the gel, of at least one surfactant;
   optionally, from 0.1% to 10% by weight, based on the total weight of the gel, of at least one extracting agent for extracting the contaminant species.

19. A gel according to claim 18, wherein the terpene comprises 35% to 94% by weight, based on the total weight of the gel, d-limonene.

20. A gel according to claim 1, wherein the at least one extracting agent is selected from the group consisting of zeolites and clays.

* * * * *